United States Patent
Hamada et al.

(10) Patent No.: US 10,072,995 B2
(45) Date of Patent: Sep. 11, 2018

(54) COKE EXTRUSION FORCE ESTIMATION METHOD AND COKE OVEN REPAIRING METHOD

(71) Applicant: JFE STEEL CORPORATION, Chiyoda-ku, Tokyo (JP)

(72) Inventors: Ryo Hamada, Tokyo (JP); Shunichi Kamezaki, Tokyo (JP); Takuya Akasaki, Tokyo (JP)

(73) Assignee: JFE Steel Corporation, Tokyo (JP)

( * ) Notice: Subject to any disclaimer, the term of this patent is extended or adjusted under 35 U.S.C. 154(b) by 503 days.

(21) Appl. No.: 14/647,313

(22) PCT Filed: Nov. 13, 2013

(86) PCT No.: PCT/JP2013/080726
§ 371 (c)(1),
(2) Date: May 26, 2015

(87) PCT Pub. No.: WO2014/084053
PCT Pub. Date: Jun. 5, 2014

(65) Prior Publication Data
US 2015/0308910 A1    Oct. 29, 2015

(30) Foreign Application Priority Data
Nov. 27, 2012    (JP) .................................. 2012-259036

(51) Int. Cl.
*C10B 33/08*    (2006.01)
*G01L 5/00*    (2006.01)
(Continued)

(52) U.S. Cl.
CPC .................................... *G01L 5/00* (2013.01);
*B23P 6/00* (2013.01); *C10B 29/06* (2013.01);
*C10B 33/10* (2013.01);
(Continued)

(58) Field of Classification Search
CPC . B23P 6/00; C10B 33/08; C10B 33/04; C10B 33/10; C10B 29/06; C10B 43/04; C10B 47/00
See application file for complete search history.

(56) References Cited

U.S. PATENT DOCUMENTS 8,311,777 B2    11/2012 Sugiura

FOREIGN PATENT DOCUMENTS

JP    2008189772    8/2008
JP    2008201993    9/2008
(Continued)

OTHER PUBLICATIONS

Machine translations of Japanese Patent Publication Nos. JP 2008-303239 A1 and JP 2008-201993 A1.*
Korean Office Action dated May 4, 2016 for Korean Application No. 2015-7012444, including Concise Statement of Relevance May 4, 2016.
(Continued)

Primary Examiner — Christopher Besler
(74) Attorney, Agent, or Firm — RatnerPrestia

(57) ABSTRACT

A coke extrusion force estimation method includes: measuring irregularities on an inner wall surface of a carbonization chamber to acquire an oven wall profile; estimating an outer shape of a coke produced in the carbonization chamber based on the oven wall profile; defining an active state for a side surface position of the coke at which a coke width is smaller than an oven width and defining a passive state for a side surface position of the coke at which a coke width is larger than an oven width based on the oven wall profile and the estimated outer shape; and calculating oven wall friction force for each side surface position of the coke using a previously set apparent Young's modulus of the coke in accordance with definition of the active state or the passive state to estimate the extrusion force based on the oven wall friction force.

7 Claims, 9 Drawing Sheets

(51) Int. Cl.
*C10B 29/06* (2006.01)
*C10B 33/10* (2006.01)
*C10B 45/00* (2006.01)
*C10B 41/02* (2006.01)
*B23P 6/00* (2006.01)

(52) U.S. Cl.
CPC .............. *C10B 41/02* (2013.01); *C10B 45/00* (2013.01); *G01L 5/0076* (2013.01)

(56) References Cited

FOREIGN PATENT DOCUMENTS

| | | |
|---|---|---|
| JP | 2008303239 | 12/2008 |
| JP | 2012046701 | 3/2012 |
| JP | 2012062366 | 3/2012 |
| JP | 20120072241 | 4/2012 |
| KR | 20090075829 | 7/2009 |
| SU | 1046120 | 10/1983 |
| WO | 2010050236 | 5/2010 |

OTHER PUBLICATIONS

European Search Report dated Oct. 28, 2015 in European Application No. 13857728.3.
Russian Office Action dated May 30, 2016 for Russian Application No. 2015119678, including English translation, 8 pages.
International Search Report for International Application No. PCT/JP2013/080726 dated Jan. 14, 2014.
Written Opinion of the International Searching Authority for International Application No. PCT/JP2013/080726 dated Jan. 14, 2014.

* cited by examiner

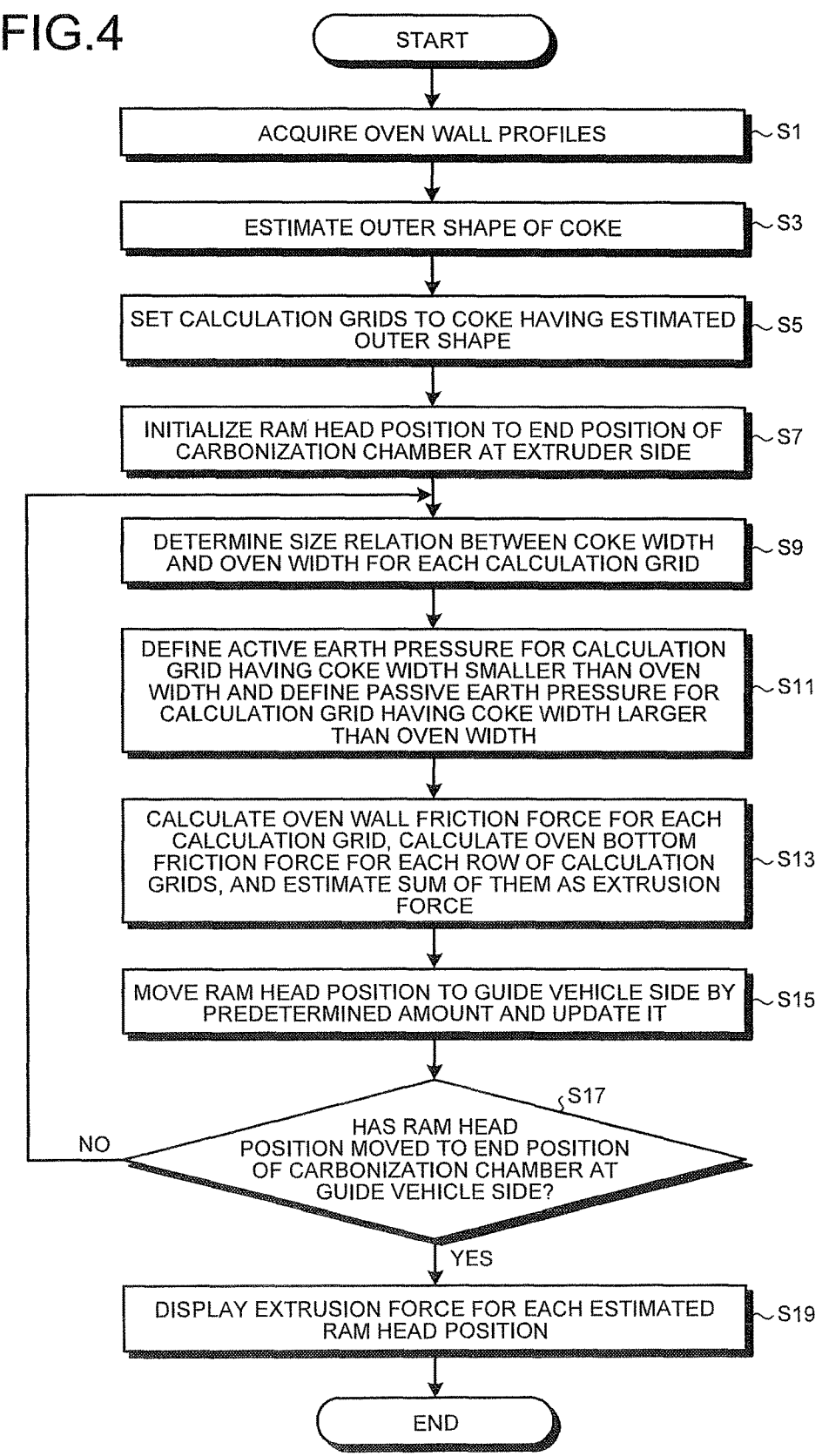

COKE EXTRUSION FORCE ESTIMATION METHOD AND COKE OVEN REPAIRING METHOD

CROSS REFERENCE TO RELATED APPLICATIONS

This is the U.S. National Phase application of PCT/JP2013/080726, filed Nov. 13, 2013, which claims priority to Japanese Patent Application No. 2012-259036, filed Nov. 27, 2012, the disclosures of each of these applications being incorporated herein by reference in their entireties for all purposes.

FIELD OF THE INVENTION

The present invention relates to a coke extrusion force estimation method for estimating extrusion force necessary for extruding coke from a coke oven and to a coke oven repairing method using the extrusion force estimated by the above-mentioned method.

BACKGROUND OF THE INVENTION

In a horizontal chamber-type coke oven (hereinafter, simply referred to as "coke oven") configured by alternately connecting combustion chambers and carbonization chambers in an adjacent manner, coke is produced by heating and dry-distilling coal (charged coal) charged and filled into the carbonization chambers with combustion gas that is supplied into the adjacent combustion chambers. The produced cakes of coke are extruded from the respective carbonization chambers by extruders and discharged to the outside of the oven. Then, the coke cakes are cooled and provided as products.

As the number of years of operation of the coke oven increases, extrusion force necessary for extruding the coke is increased because of irregularities formed on oven walls due to deterioration over long use. This results in the occurrence of a phenomenon called extrusion stoppage or oven clogging, which can make the discharge of coke from the carbonization chambers difficult in some cases. The occurrence of extrusion stoppage or oven clogging may involve the lowering of extrusion cycles by the extruders and so on and thus lower productivity. To avoid these situations, it is important to grasp the extrusion force when the coke oven is operated.

For example, Patent Literature 1 discloses a method for deriving a resistance index that the coke receives when extruded based on information relating to irregularities generated on the side wall surfaces of a carbonization chamber. Patent Literature 2 discloses a method for calculating an extrusion load of a coke cake by performing an extrusion test of a test coke cake.

PATENT LITERATURE

Patent Literature 1: Japanese Patent Application Laid-open No. 2008-201993
Patent Literature 2: Japanese Patent Application Laid-open No. 2012-62366

In the technique described in Patent Literature 1, although the resistance index is derived based on the irregularity information acquired by observing an oven wall, the derived resistance index is merely an indirect index and a state of the oven wall is evaluated only based on a correspondence relation between the resistance index and an actual extrusion load. For this reason, it is difficult to estimate the extrusion force of the coke directly with the technique described in Patent Literature 1. The technique described in Patent Literature 2 requires a repeated extrusion load test for simulating a carbonization chamber in an actual coke oven while using test coke cakes previously produced, which can result in a troublesome task and an increase in cost for estimating the extrusion force.

SUMMARY OF THE INVENTION

The present invention has been made in view of the above-mentioned circumstances and an object thereof is to provide a coke extrusion force estimation method capable of estimating coke extrusion force with high accuracy in consideration of deformation of an oven wall of a carbonization chamber and provide a coke oven repairing method capable of effectively preventing generation of extrusion stoppage and oven clogging, which can make the discharge of coke difficult.

To solve the above-described problem and achieve the object, a coke extrusion force estimation method according to the present invention includes a method for estimating extrusion force necessary for extruding coke in a carbonization chamber configuring a coke oven along an extrusion direction, and includes: measuring irregularities on an inner wall surface of the carbonization chamber so as to acquire an oven wall profile; estimating an outer shape of the coke that is produced in the carbonization chamber based on the oven wall profile; defining an active state for a side surface position of the coke at which a coke width is smaller than an oven width and defining a passive state for a side surface position of the coke at which a coke width is larger than an oven width based on the oven wall profile and the outer shape of the coke that has been estimated; and calculating oven wall friction force for each side surface position of the coke using a previously set apparent Young's modulus of the coke in accordance with definition of the active state or the passive state for the side surface position of the coke so as to estimate the extrusion force based on the oven wall friction force.

Moreover, a coke oven repairing method according to an embodiment of the present invention includes: estimating extrusion force by the coke extrusion force estimation method according to the present invention; flattening equal to or more than one projection and/or recess so as to modify an oven wall profile; estimating extrusion force when the oven wall profile is set to an oven wall profile after modified using the coke extrusion force estimation method; and specifying the projection and/or recess flattened as a repairing place in accordance with an increase/decrease amount of the extrusion force between before and after the oven wall profile is modified, wherein a repairing operation is performed on the repairing place.

According to the present invention, coke extrusion force can be estimated with high accuracy in consideration of deformation of an oven wall of a carbonization chamber. Furthermore, according to the present invention, generation of extrusion stoppage and oven clogging, which can make the discharge of coke difficult, can be effectively prevented.

BRIEF DESCRIPTION OF THE DRAWINGS

FIG. 3-1 is a cross-sectional view illustrating a state where coke is extruded from a carbonization chamber having deformed oven walls.

FIG. 3-2 is another cross-sectional view illustrating the state where the coke is extruded from the carbonization chamber having the deformed oven walls.

FIG. 4 is a flowchart illustrating processing procedures of extrusion force estimation processing.

FIG. 5-1 is a view illustrating an example of an oven wall profile of one oven wall of the carbonization chamber.

FIG. 5-2 is a view illustrating an example of an oven wall profile of the other oven wall of the carbonization chamber.

DETAILED DESCRIPTION OF EMBODIMENTS OF THE INVENTION

Figure 1:
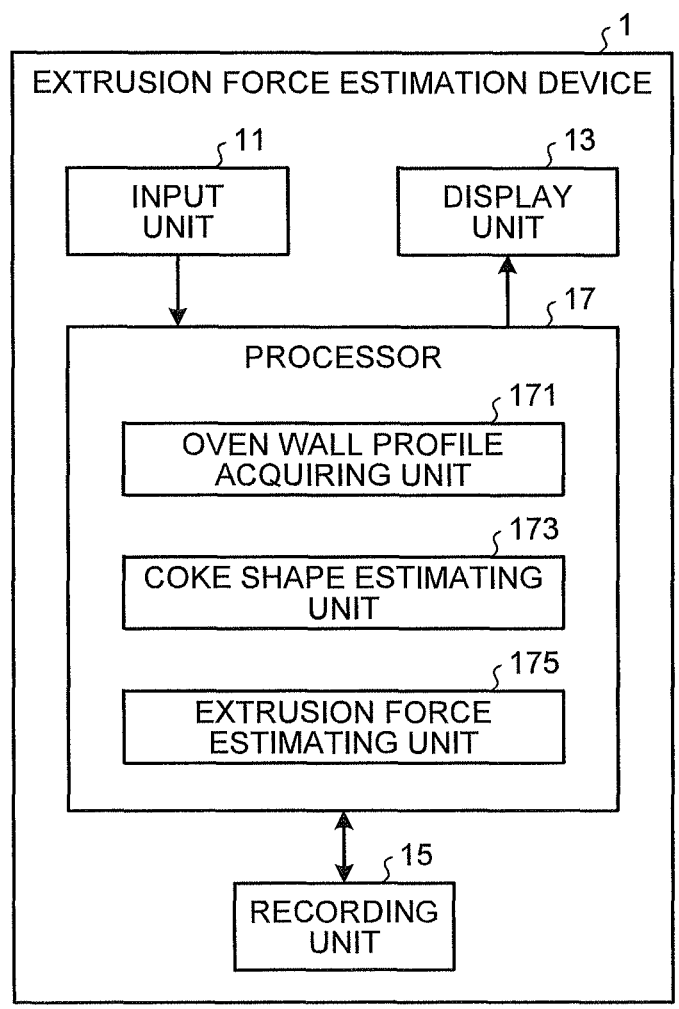
FIG. 1 is a block diagram illustrating an example of the configuration of an extrusion force estimation device.

Hereinafter, embodiments for putting a coke extrusion force estimation method and a coke oven repairing method according to the present invention into practice will be described with reference to the accompanying drawings. It should be noted that the embodiments do not limit the present invention. The same reference numerals denote the same constituent components in the drawings.

FIG. 1 is a block diagram illustrating an example of the configuration of an extrusion force estimation device 1 in the embodiment. The extrusion force estimation device 1 is configured using a general-purpose computer such as a workstation and a personal computer, for example, and performs processing (extrusion force estimation processing) for estimating extrusion force of coke that is produced in a coke oven. As illustrated in FIG. 1, the extrusion force estimation device 1 includes an input unit 11, a display unit 13, a recording unit 15, and a processor 17 as main functional units. The coke oven is configured by alternately arranging combustion chambers and carbonization chambers so as to be connected in an adjacent manner and is used for producing coke in the following manner: coal is charged and filled into the individual carbonization chambers and fuel gas is supplied into the individual combustion chambers, and the carbonization chambers are heated with heat that is generated from the combustion chambers at both sides. With this heating, the coal (charged coal) charged and filled into the carbonization chambers is dry-distilled and the coke is produced.

The input unit 11 is configured by an input device such as a keyboard, a mouse, a touch panel, and switches of various types, for example, and outputs an input signal in accordance with operation input to the processor 17. The display unit 13 is configured by a display device such as a liquid crystal display (LCD), an electroluminescent (EL) display, and a cathode ray tube (CRT) display and displays screens of various types based on display signals input from the processor 17.

The recording unit 15 is configured by an information recording medium such as an updatable and recordable flash memory and a hard disk and a memory card that are incorporated or connected through a data communication terminal, and a reading/writing device thereof, and a recording device suitable for its use can be employed to be used appropriately. Computer programs for operating the extrusion force estimation device 1 and executing various functions of the extrusion force estimation device 1 and pieces of data and the like that are used during execution of the computer programs are previously stored in the recording unit 15 or temporarily stored therein for every processing.

The processor 17 is configured by a central processing unit (CPU) or the like and controls operations of the extrusion force estimation device 1 by, for example, transmitting directions or transferring pieces of data to the corresponding parts configuring the extrusion force estimation device 1 based on the input signal input from the input unit 11 and the computer programs, the pieces of data, and the like stored in the recording unit 15. The processor 17 includes an oven wall profile acquiring unit 171, a coke shape estimating unit 173, and an extrusion force estimating unit 175.

Figure 2:
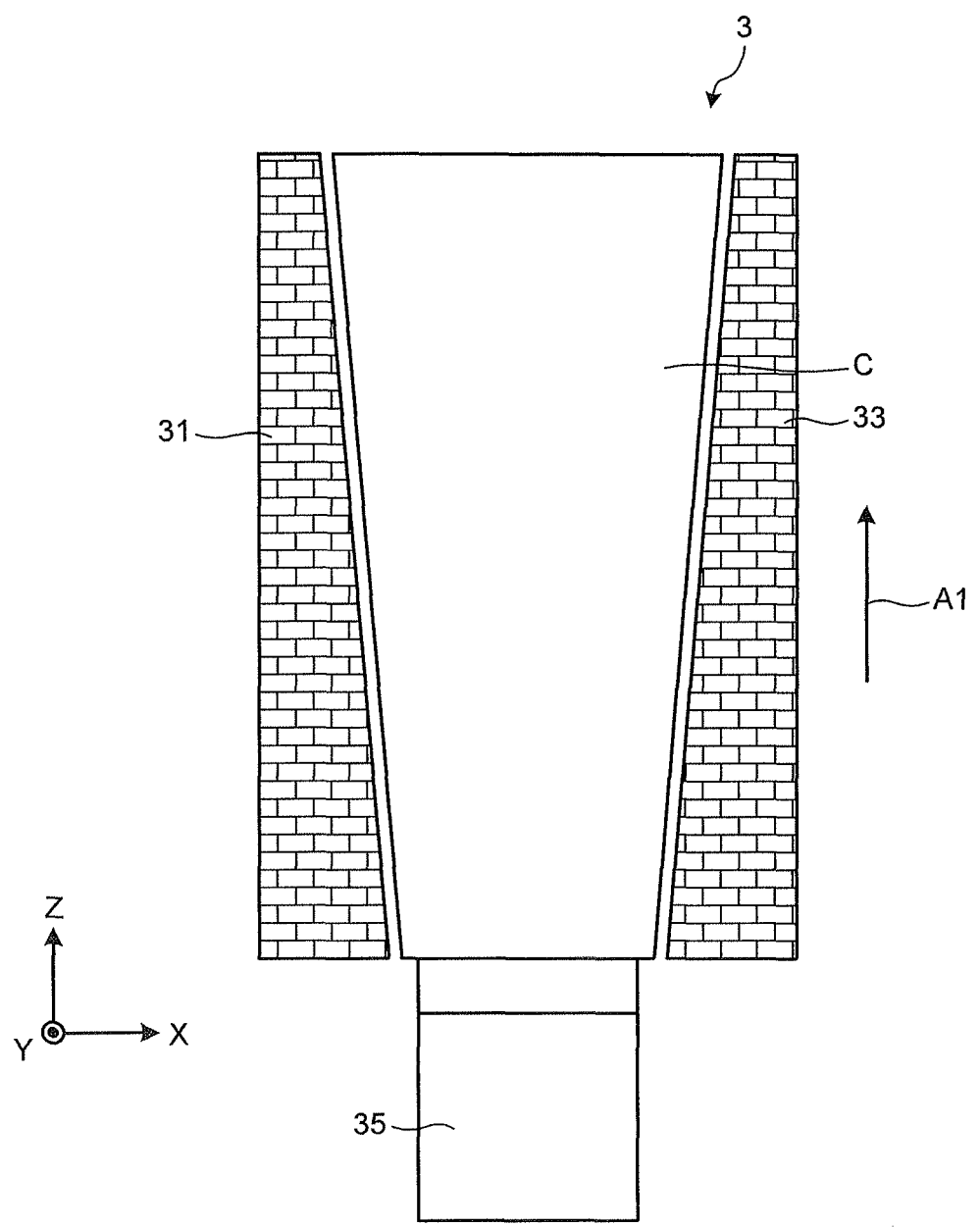
FIG. 2 is a plan view illustrating one carbonization chamber configuring a coke oven.

First, the principle of the extrusion force estimation processing that is performed by the extrusion force estimation device 1 will be described. FIG. 2 is a plan view illustrating one carbonization chamber 3 configuring the coke oven. In FIG. 2 and the like, an oven width direction of the carbonization chamber 3 is set to the X direction, a height direction is set to the Y direction, and a depth direction (extrusion direction A1) is set to the Z direction. As illustrated in FIG. 2, the carbonization chamber 3 is configured while being partitioned from adjacent combustion chambers (not illustrated) by oven walls 31 and 33 and coke C is produced in the carbonization chamber 3. A ram head of an extruder 35 that is inserted from the extruder side (lower side in FIG. 2) of the coke oven extrudes the produced coke C in the extrusion direction A1. Then, the extruded coke C is delivered to a guide vehicle (not illustrated) that stands by at the guide vehicle side at the opposite side to the extruder side with the carbonization chamber 3 interposed therebetween. The inner wall surfaces of the oven walls 31 and 33 are formed to have tapered shapes such that the oven width is larger at the guide vehicle side than that at the extruder side in order to efficiently extrude the coke C from the carbonization chamber 3.

The present invention aims at estimating coke extrusion force using earth pressure theory for calculating an earth pressure acting on a surface on which a retaining wall or the like makes contact with earth. That is to say, generation states of an active earth pressure and a passive earth pressure in earth pressure theory are estimated based on oven wall profiles while the coke oven walls (oven walls 31 and 33 of the carbonization chamber 3) are regarded as retaining walls and the coke cake (coke C) that is produced at the inner sides of the inner wall surfaces of the coke oven walls on which deformation such as irregularities can be generated is regarded as earth, so that the extrusion force of the coke C is directly estimated. In the earth pressure, the earth pressure the principal stress direction of which is the vertical direction and that the retaining walls receive when being away from earth is called active earth pressure and the earth pressure the principal stress direction of which is the horizontal direction and that the retaining walls receive when heading to earth (pushing earth) is called passive earth pressure. Normal force against the passive earth pressure is larger than that against the active earth pressure.

In order to estimate the extrusion force as described above, in the extrusion force estimation processing in the embodiment, the coke C that is dry-distilled and produced at the inner sides of the inner wall surfaces of the oven walls 31 and 33 is handled as one elastic body (or plastic body). Side surface positions in both the side surfaces at which the inner wall surfaces of the oven walls 31 and 33 opposing them are extended outward so as to be farther from the coke C are defined as an active state. On the other hand, side surface positions in both the side surfaces at which the inner wall surfaces of the oven walls 31 and 33 opposing them are extended inward so as to make closer to the coke C are defined as a passive state.

In the case of the oven walls 31 and 33 when initially manufactured, that is, while deformation due to deterioration over long use has been not generated on the oven walls 31 and 33 and the inner wall surfaces thereof keep their tapered shapes as illustrated in FIG. 2, the width of the coke C (coke width) is kept smaller than the oven width in a process where the coke C is extruded in the extrusion direction A1. Accordingly, the coke C is extruded in a state where any side surface positions thereof in both the side surfaces do not make contact with the oven wall 31 or 33 or a state (active state) where the active earth pressure is generated.

Figures 1, 3:
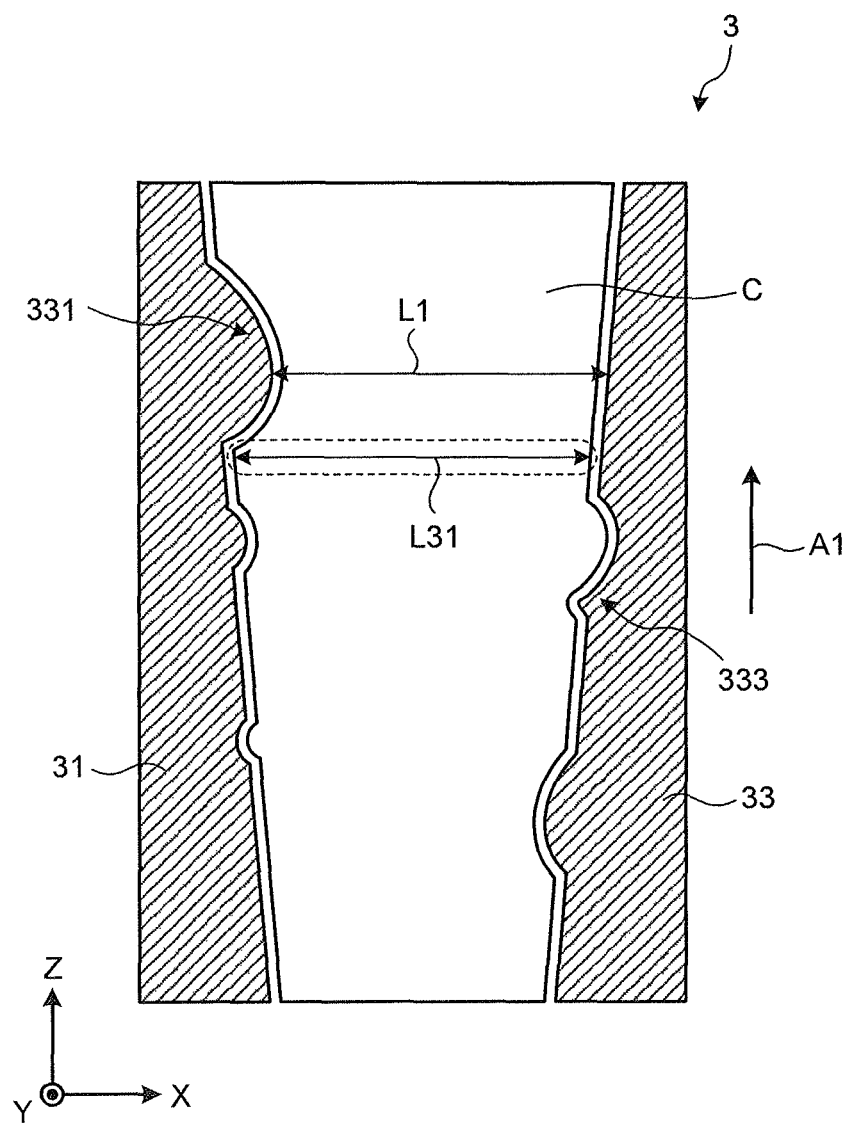
Figures 2, 3:
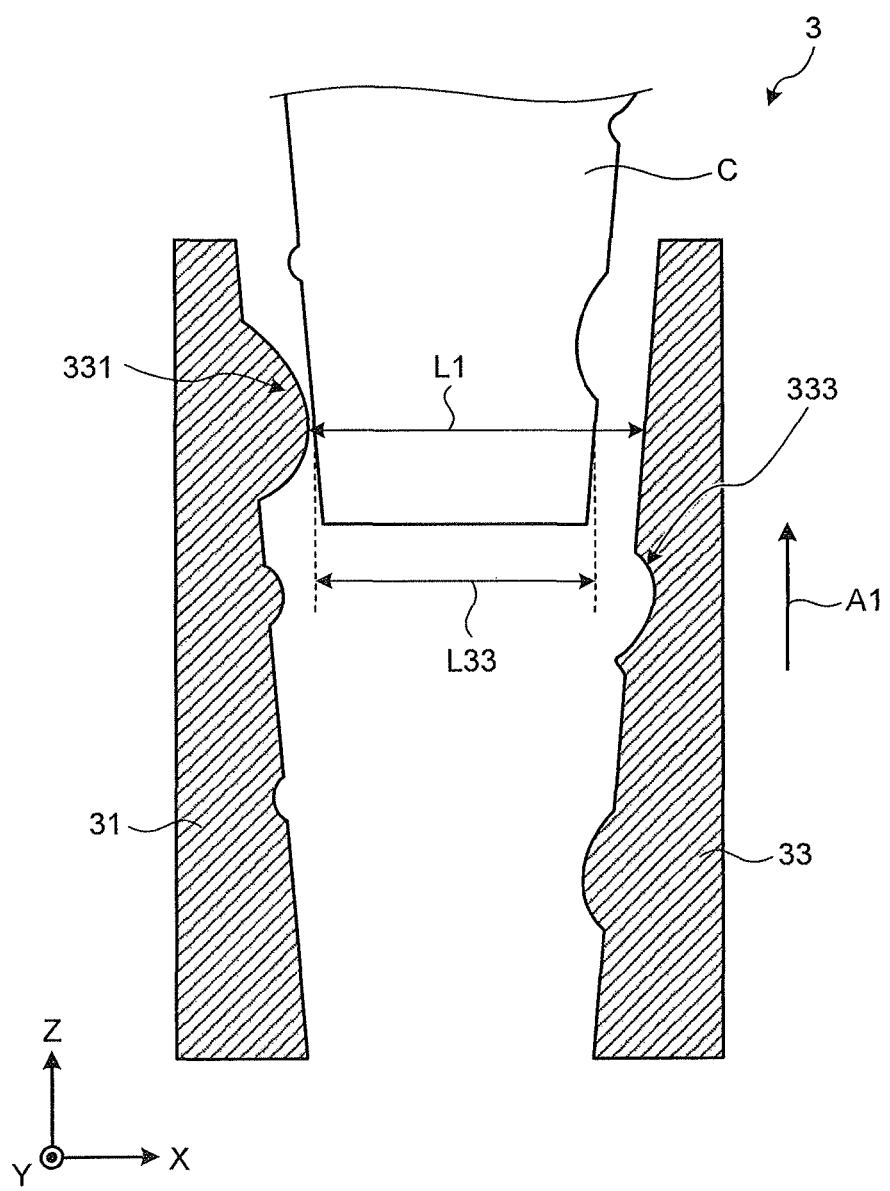

The following describes a case where deterioration of the oven body over long use has advanced and deformation has been generated on the oven walls 31 and 33. The deformation on the oven walls 31 and 33 due to deterioration over long use indicates local formation of irregularities on the inner wall surfaces of the oven walls 31 and 33 due to deterioration over long use or change in the shapes of the inner wall surfaces due to abrasion of the overall inner wall surfaces. FIG. 3-1 and FIG. 3-2 are cross-sectional views illustrating a state where the coke C is extruded from the carbonization chamber 3 having the oven walls 31 and 33 deformed with formation of projections 331 and recesses 333 on the inner wall surfaces, for example. The coke C that is produced in the carbonization chamber 3 has the outer shape substantially along the inner wall surfaces of the oven walls 31 and 33. That is to say, as illustrated in FIG. 3-1, both the side surfaces of the coke C are recessed along the projections 331 at the places at which the projections 331 are formed and the oven walls 31 and 33 protrude, whereas they project along the recesses 333 at the places at which the recesses 333 are formed and the oven walls 31 and 33 get dented.

In the process where the coke C is extruded in the extrusion direction A1, the oven width at the projection formation position can be smaller than the coke width of the coke C passing through the position. In this case, the coke C is compressed by an amount by which the oven width is smaller than the coke width on the place where the coke width is large as described above and is extruded in the state (passive state) where the passive earth pressure is generated. This results in an increase in the necessary extrusion force because the normal force against the passive earth pressure is larger than that against the active earth pressure. For example, a coke width L31 on a portion of the coke C that is surrounded by a dashed line in FIG. 3-1 is larger than an oven width L1 at a formation position of the projection 331. The difference in the width causes the side surface positions of the coke C at both sides of the dashed line portion to be compressed when the side surface positions pass through the formation position of the projection 331 and be made into the passive state in the process where the coke C is extruded from the state of FIG. 3-1.

Whether the side surface positions in both the side surfaces of the coke C are in the active state or the passive state depends on the coke width that is smaller or larger than the oven width at a passage position. In other words, the side surface positions of the coke C that pass through the projection formation position are not necessarily (compressed) in the passive state. The coke C is formed to have the outer shape that the coke width is small at the extruder side and the coke width is large at the guide vehicle side as a whole. When a portion of the coke C having the small coke width at the extruder side passes through the formation position of the projection 331 as illustrated in FIG. 3-2, a coke width L33 thereof is smaller than the oven width L1 and is not made into the passive state.

In consideration of the above-mentioned circumstances, in the extrusion force estimation processing, the extrusion force is estimated after the active state or the passive state is defined by comparing the coke width of the coke C and the oven width at a passage position each time while displacement of a position of the coke C in the extrusion direction A1 (extrusion direction position) in the carbonization chamber 3 with extrusion by the ram head in the extrusion direction A1 is virtually reproduced.

FIG. 4 is a flowchart illustrating processing procedures of the extrusion force estimation processing. The extrusion force estimation device 1 performs the extrusion force estimation processing in accordance with the processing procedures in FIG. 4 so as to execute the extrusion force estimation method. The following describes the case where one carbonization chamber 3 is focused and extrusion force necessary for extruding the coke C in the corresponding carbonization chamber 3 is estimated. The processing described herein can be executed by storing a computer program for executing the extrusion force estimation processing in the recording unit 15 and reading and executing the computer program by the processor 17.

As illustrated in FIG. 4, in the extrusion force estimation processing, the oven wall profile acquiring unit 171 acquires the oven wall profiles of the oven walls 31 and 33 of the carbonization chamber 3 that is focused first (step S1). It should be noted that the oven wall profiles of the oven walls 31 and 33 may be previously acquired and stored in the recording unit 15, and be read out for use.

Figures 1, 5:
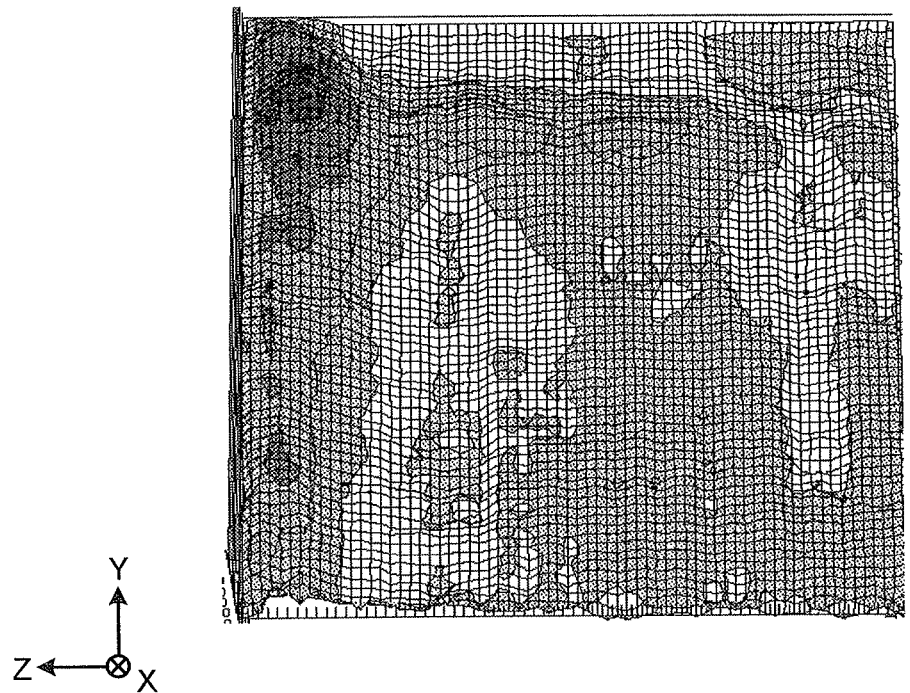
Figures 2, 5:
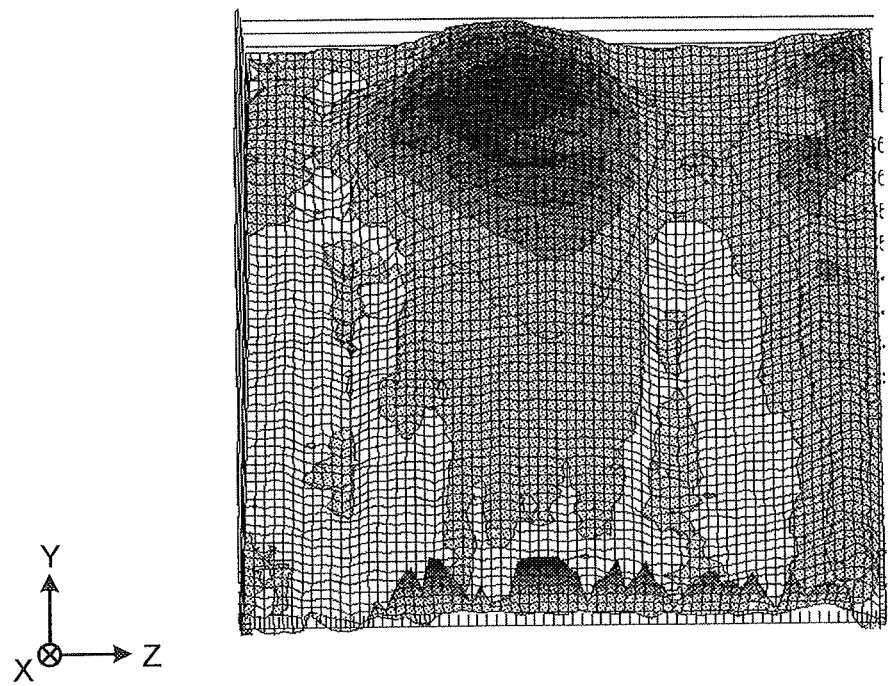

FIG. 5-1 is a view illustrating an example of the oven wall profile of one oven wall of the carbonization chamber 3 and FIG. 5-2 is a view illustrating an example of the oven wall profile of the other oven wall. The oven wall profiles express the shapes of predetermined regions (main regions; 6.5-square-meter regions) of the inner wall surfaces of the respective oven walls 31 and 33. In FIG. 5-1 and FIG. 5-2, amounts of irregularities on the inner wall surfaces are expressed with color density. When the oven wall profiles are acquired, the irregularities on the inner wall surfaces of the respective oven walls 31 and 33 are measured by a laser scanner, first. Subsequently, an initial state of the inner wall surface when initially manufactured and a measured value by the laser scanner are compared for each of the oven walls 31 and 33 so as to acquire an amount of the irregularities on the main region of the inner wall surface relative to the initial state and form each oven wall profile. Although the oven wall profiles on the main regions of the inner wall surfaces of the oven walls 31 and 33 are formed, the irregularities on the entire regions of the inner wall surfaces may be measured and the oven wall profiles thereof may be acquired. With this processing, the degree of deformation of the oven walls 31 and 33 due to deterioration over long use, that is, the degrees of projections and recesses of the inner wall surfaces thereof due to deterioration over long can be grasped over the entire inner wall surfaces or the entire main regions thereof.

Thereafter, the coke shape estimating unit 173 estimates the outer shape of the coke C that is produced in the focused carbonization chamber 3 (step S3). At step S3, the coke shape estimating unit 173 estimates the outer shapes of both the side surfaces of the coke C along the shapes (irregularities) of the inner wall surfaces of the oven walls 31 and 33 that are expressed by the oven wall profiles as described above.

Figure 6:
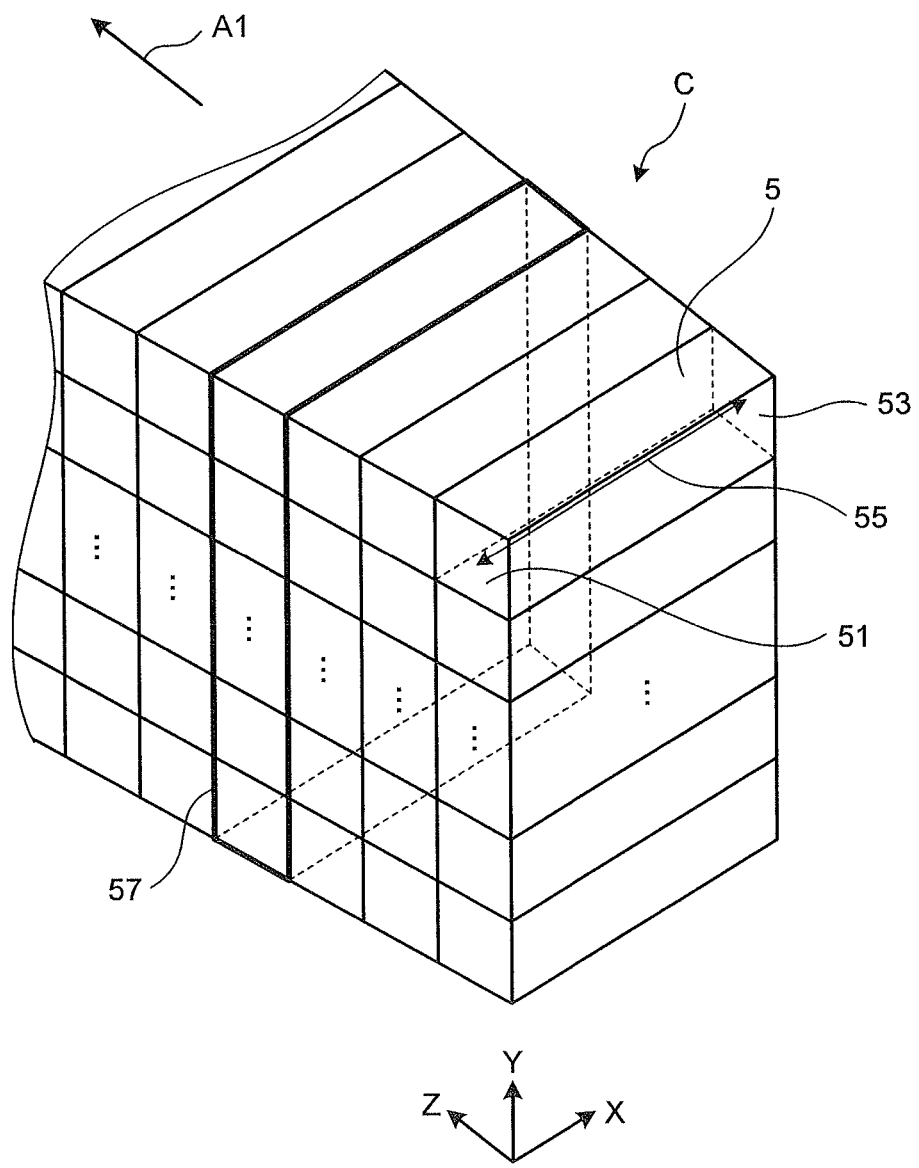
FIG. 6 is a view illustrating calculation grids that are set to coke.

The coke shape estimating unit 173 divides the coke C having the outer shape estimated at step S3 and sets calculation grids (step S5). FIG. 6 is a view illustrating calculation grids 5 that are set to the coke C. It should be noted that the side surfaces of the coke C are flat surfaces in FIG. 6 but are appropriately estimated to be side surfaces on which irregularities are formed based on the oven wall profiles by the processing at step S3 actually. At step S5, as illustrated in FIG. 6, the extrusion force estimating unit 175 sets the calculation grids 5 in which rectangular ranges corresponding to the side surface positions formed by dividing both the side surfaces of the coke C having the estimated outer shape into a predetermined size are set to end surfaces 51 and 53 and a length 55 therebetween corresponds to the coke width. In processing at a subsequent stage, oven wall friction force is calculated for each calculation grid 5 and oven bottom friction force is calculated for each row of the calculation grids 5.

After that, the extrusion force estimating unit 175 performs pieces of processing at step S7 to step S17 and sequentially estimates extrusion force necessary for extruding the coke C at a corresponding extrusion direction position while moving the position of the ram head to the guide vehicle side from the extruder side by a predetermined amount each time.

That is to say, first, the extrusion force estimating unit 175 initializes the ram head position to an initial position (end position of the carbonization chamber 3 at the extruder side) (step S7).

Subsequently, the extrusion force estimating unit 175 determines the coke width and the oven width for each calculation grid 5 in accordance with the extrusion direction position of the coke C that is defined by the current ram head position based on the oven wall profiles of the oven walls 31 and 33 and the estimated outer shape of the coke C (step S9). The extrusion force estimating unit 175 defines the active earth pressure and a width difference for the calculation grid 5 having the coke width smaller than the oven width, whereas it defines the passive earth pressure and a width difference for the calculation grid 5 having the coke width larger than the oven width (step S11).

For example, as the calculation grid 5 at an uppermost front position that is denoted with a reference numeral in FIG. 6 is focused, the positions in the inner wall surfaces of the oven walls 31 and 33 that oppose the end surfaces 51 and 53 of the calculation grid 5, respectively, are specified based on the extrusion direction position of the coke C so as to calculate the oven width at the specified positions with reference to the oven wall profiles of the oven walls 31 and 33. The length 55 of the calculation grid 5 is set to the coke width and the coke width is compared with the calculated oven width so as to determine the size relation. In addition, the width difference between the coke width and the oven width is also calculated. Thereafter, when the coke width is smaller than the oven width, the active earth pressure and the oven width are defined for the calculation grid 5. On the other hand, when the coke width is larger than the oven width, the passive earth pressure and the oven width are defined for the calculation grid 5. At steps S9 and S11 in FIG. 4, the above-mentioned pieces of processing are performed on all the calculation grids 5.

Then, the extrusion force estimating unit 175 calculates oven wall friction force for each calculation grid 5, calculates oven bottom friction force for each row of the calculation grids 5, and estimates the sum of them as the extrusion force (step S13).

First, the extrusion force estimating unit 175 sets all the calculation grids 5 to processing targets in turns and calculates the oven wall friction force for each of the calculation grids 5 in accordance with the definition of the active state or the passive state for the calculation grid 5 as the processing target. The apparent Young's modulus (elastic modulus) that is used for calculating the oven wall friction force is calculated statistically based on the measured value of the extrusion force measured when the coke actually produced in the coke oven is extruded from the carbonization chamber 3, the oven wall profiles, and the like, and set in advance. An oven wall frictional coefficient is set to a fixed value and is set in advance. The normal force or the stress that causes the calculation grid 5 as the processing target to be deformed in an expanded or compressed manner when it passes through between the opposing oven walls is calculated using the apparent Young's modulus based on the definition of the active state or the passive state of the calculation grid 5 as the processing target and the width difference and is multiplied by the friction coefficient so as to calculate the oven wall friction force. This calculation can provide the oven wall friction force for each calculation grid 5.

Subsequently, the calculation grids 5 in each row are set as the processing targets and the oven bottom friction force is calculated for each row of the calculation grid 5. An oven bottom friction coefficient that is used for calculating the oven bottom friction force is set to a fixed value and is set in advance. For example, as one row 57 surrounded by a bold line in FIG. 6 is focused, first, a weight thereof is calculated based on a volume of the coke C for the one row 57 and a previously set coke density. Then, the calculated weight is multiplied by the oven bottom friction coefficient so as to calculate the oven bottom friction force. This calculation can provide the oven bottom friction force for each row of the calculation grids 5.

Thereafter, the sum of the oven wall friction forces for the respective calculation grids 5 and the sum of the oven bottom friction forces for the respective rows of the calculation grids 5 are totalized so as to estimate it as extrusion force necessary for extruding the coke C at the current ram head position.

After the extrusion force is estimated as described above, the extrusion force estimating unit 175 moves the ram head position to the guide vehicle side by a predetermined amount to update it (step S15). Until the ram head position reaches an end position of the carbonization chamber 3 at the guide vehicle side (No at step S17), the process returns to step S9 and the above-mentioned pieces of processing are repeated. The movement amount of the ram head position may be set appropriately. When the extrusion force estimating unit 175 moves the ram head position to the end position of the carbonization chamber 3 at the guide vehicle side (Yes at step S17), it performs the processing of displaying the extrusion force for each estimated ram head position on the display unit 13 (step S19) so as to offer an operator it.

Figure 7:
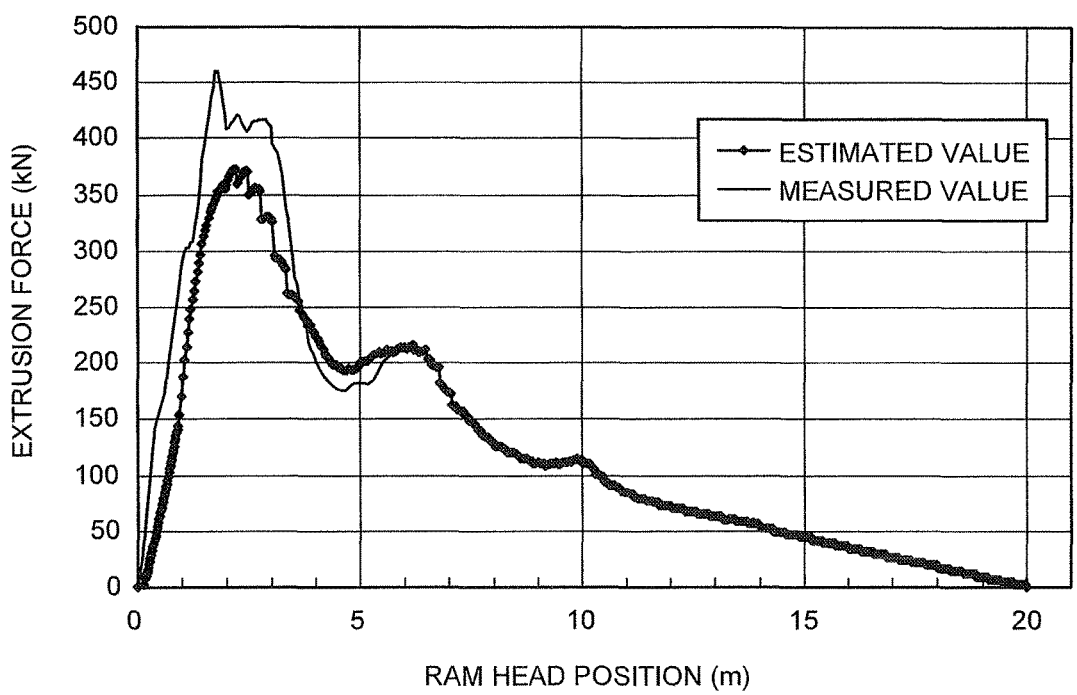
FIG. 7 is a graph illustrating estimated values and measured values of extrusion force for respective ram head positions.

The extrusion force for each ram head position was estimated by performing the extrusion force estimation processing in accordance with the processing procedures in FIG. 4 and the measured value of the extrusion force for each ram head position was obtained by performing an operation of the coke oven actually. FIG. 7 is a graph of the estimated values and the measured values while the horizontal axis is set to the ram head position and the vertical axis is set to the extrusion force. For calculation of the estimated value as illustrated in FIG. 7, the apparent Young's modulus of the coke C was set to 70 kN/m², the coke weight of the carbonization chamber 3 as the processing target was set to approximately 20 ton, the oven bottom friction coefficient and the oven wall friction coefficient based on experimental values were set to 0.6. The extrusion force was estimated by assigning the coke weight to each row 57 of the calculation grids 5, calculating the normal force that is generated on the oven bottom, and using the oven bottom friction coefficient. As illustrated in FIG. 7, it was found that the measured value could be estimated with high accuracy by the estimation of the extrusion force in accordance with the processing procedures in FIG. 4.

As described above, according to the embodiment, the irregularities on the inner wall surfaces of the oven walls 31 and 33 of the carbonization chamber 3 are measured by the laser scanner so as to acquire the oven wall profiles of the oven walls 31 and 33. The extrusion force necessary for extruding the coke C from the coke oven can be estimated for each ram head position using the oven wall profiles, so that direct estimation of the extrusion force of the coke C can be executed. Accordingly, the extrusion force of the coke C at each extrusion direction position until the coke C is extruded to the guide vehicle side from the extruder side in the carbonization chamber 3 can be estimated with high accuracy in consideration of the deformation of the oven walls 31 and 33 of the carbonization chamber 3 due to deterioration over long use.

Furthermore, according to the embodiment, influence that is given on the extrusion force necessary for extruding the coke C by the deformation of the oven walls 31 and 33 due to deterioration over long use can be grasped, thereby quantitatively determining the necessity of the repairing of the inner wall surfaces of the oven walls 31 and 33 without depending on subjective determination based on experience or the like by the operator. When repairing is determined to be necessary, a repairing operation of the inner wall surfaces is performed actually so as to avoid the lowering of productivity of the coke.

Furthermore, according to the embodiment, a dedicated device for estimating the extrusion force for a test is not required to be prepared additionally, thereby preventing a troublesome task and cost from being increased.

Although the coke C is extruded from the carbonization chamber 3 including the oven walls 31 and 33 having the tapered inner wall surfaces in the above-mentioned embodiment, the present invention can be also applied to the case where the coke is produced in a carbonization chamber including the oven walls 31 and 33 having parallel inner wall surfaces and is extruded.

Figure 8:
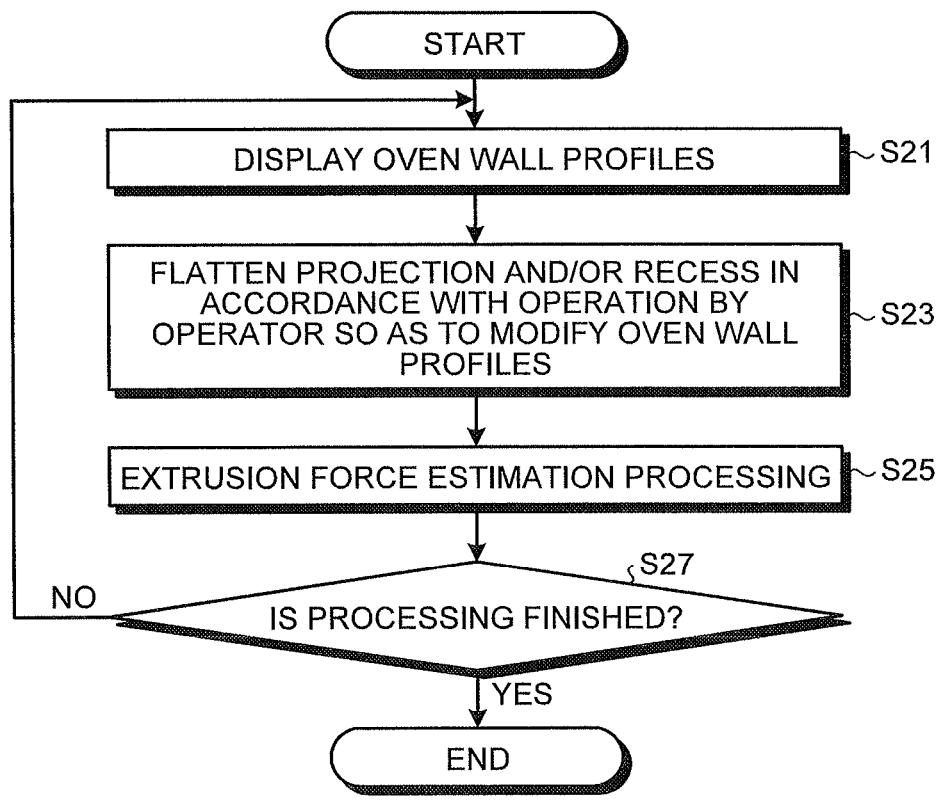
FIG. 8 is a flowchart illustrating processing procedures of repairing place specifying processing.

Although the extrusion force estimation processing of estimating the extrusion force of the coke C has been described in the above-mentioned embodiment, repairing place specifying processing may be performed so as to specify a repairing place on the oven walls 31 and 33 after the extrusion force estimation processing. FIG. 8 is a flowchart illustrating processing procedures of the repairing place specifying processing. In the modification, the extrusion force estimation device 1 performs the extrusion force estimation processing in FIG. 4, and then, performs the repairing place specifying processing in accordance with the processing procedures in FIG. 8 so as to actually repair the inner wall surfaces of the oven walls 31 and 33 based on the specified repairing place. In this manner, a coke oven repairing method is executed.

As illustrated in FIG. 8, in the repairing place specifying processing, first, the processor 17 performs the processing of displaying the oven wall profiles of the oven walls 31 and 33 as illustrated in FIG. 5-1 and FIG. 5-2 on the display unit 13 (step S21). Subsequently, the processor 17 receives an operation of specifying a projection that is expressed by deep color and/or a recess that is expressed by light color on the oven wall profiles subjected to the display processing and flatten the projection and/or the recess specified so as to modify the oven wall profiles (step S23). Then, the extrusion force estimation processing in FIG. 4 is performed again (step S25). It should be noted that in the extrusion force estimation processing that is performed at step S25, the oven wall profiles modified at step S23 in FIG. 8 are acquired at step S1 in FIG. 4. With this, the extrusion force for each ram head position when the shapes of the inner wall surfaces of the oven walls 31 and 33 are set to the shapes that are expressed by the modified oven wall profiles can be acquired.

Thereafter, the operator compares estimation results of the extrusion forces before and after the modification of the oven wall profiles. When the extrusion force is largely reduced, the projection and/or the recess specified at step S23 are/is specified as the repairing place(s). In this case, the shape of the projection is adjusted by an abrasion device such as a sandblast and/or thermal spraying processing of spraying the recess with a thermal spraying material is performed. In this manner, the repairing operation is performed on the specified repairing place.

It should be noted that the repairing place may be automatically specified and offered to the operator. For example, the processor 17 may perform the processing of calculating an increase/decrease amount of the extrusion force between before and after the modification of the oven wall profiles after step S25. Then, the processor 17 specifies the projection and/or the recess specified at step S23 as the repairing place when the increase/decrease amount exceeds a predetermined threshold and displays the specified repairing place on the display unit 13 so as to offer the operator the repairing place(s).

On the other hand, when the extrusion force does not change largely between before and after the modification of the oven wall profiles, the operator can determine that the extrusion force cannot be largely improved even when the projection and/or the recess specified at step S23 are/is repaired. In this case, the operator can continue to specify a repairing place capable of improving the extrusion force by operating to specify another projection or recess newly. That is to say, the process returns to step S21 (No at step S27) without finishing the repairing place specifying processing at step S27 (Yes at step S27) and the above-mentioned pieces of processing are repeated.

In the modification, the coke extrusion force can be estimated directly while supposing the case where the inner wall surfaces of the oven walls 31 and 33 have been repaired actually only by specifying the projection or the recess with reference to the oven wall profiles. The modification can, therefore, improve estimation performance and can specify the repairing place capable of reducing the extrusion force. Accordingly, the necessity of the repairing on the projection or the recess formed on the inner wall surfaces of the oven walls 31 and 33 can be determined appropriately. Furthermore, the repairing operation is performed on the specified repairing place actually so as to efficiently perform the repairing operation. The repairing operation can effectively prevent generation of extrusion stoppage or oven clogging, which can make the discharge of the coke difficult so as to avoid the lowering of the productivity of the coke.

Although the oven wall profiles are acquired using the laser scanner in the above-mentioned embodiment, a measurement device that is used is not limited to the laser scanner and may be any device as long as it can measure irregularities on the inner wall surfaces of the oven walls 31 and 33. For example, the oven wall profiles may be acquired by measuring the irregularities on the inner wall surfaces of the oven walls 31 and 33 using a linear image camera and a laser projector in combination and so on.

As described above, the present invention can be applied to the processing of estimating the extrusion force necessary for extruding the coke from the coke oven and coke oven repairing processing using the extrusion force estimated by the processing.

REFERENCE SIGNS LIST 1 extrusion force estimation device
11 input unit
13 display unit
15 recording unit
17 processor
171 oven wall profile acquiring unit
173 coke shape estimating unit
175 extrusion force estimating unit

The invention claimed is:

1. A coke extrusion method including a coke extrusion force estimation method for estimating extrusion force necessary for extruding coke in a carbonization chamber configured as a coke oven along an extrusion direction, the coke extrusion method comprising:
measuring irregularities on an inner wall surface of the carbonization chamber so as to acquire an oven wall profile;
estimating an outer shape of the coke that is produced in the carbonization chamber based on the oven wall profile;
defining an active state for a first side surface position of the coke at which a first coke width is smaller than a first oven width and defining a passive state for a second side surface position of the coke at which a second coke width is larger than a second oven width based on the oven wall profile and the outer shape of the coke that has been estimated; and
calculating oven wall friction force for each of the first and the second side surface positions of the coke using a previously determined Young's modulus of the coke in accordance with definition of the active state or the passive state for the first or the second side surface position of the coke so as to estimate the extrusion force based on the oven wall friction force, wherein the Young's modulus is calculated statistically based on a measured value of the extrusion force measured when coke actually produced in the coke oven is extruded from the carbonization chamber; and
extruding the coke from the carbonization chamber by applying the estimated extrusion force to the coke.

2. The coke extrusion method according to claim 1, wherein the extrusion force at each of a plurality of positions along the extrusion direction is estimated while the coke is displaced through each of the plurality of positions along the extrusion direction in the carbonization chamber.

3. The coke extrusion method according to claim 1, wherein the inner wall surface of the carbonization chamber is formed to have such a tapered shape that a third oven width at a guide vehicle side is larger than a fourth oven width at an extruder side of the coke oven.

4. A coke oven repairing method comprising:
estimating extrusion force by a coke extrusion force estimation method for estimating extrusion force necessary for extruding coke in a carbonization chamber configured as a coke oven along an extrusion direction, the coke extrusion force estimation method comprising:
measuring irregularities on an inner wall surface of the carbonization chamber so as to acquire an oven wall profile;
estimating an outer shape of the coke that is produced in the carbonization chamber based on the oven wall profile;
defining an active state for a first side surface position of the coke at which a first coke width is smaller than a first oven width and defining a passive state for a second side surface position of the coke at which a second coke width is larger than a second oven width based on the oven wall profile and the outer shape of the coke that has been estimated; and
calculating oven wall friction force for each of the first and the second side surface positions of the coke using a previously determined Young's modulus of the coke in accordance with definition of the active state or the passive state for the first or the second side surface position of the coke so as to estimate the extrusion force based on the oven wall friction force, wherein the Young's modulus is calculated statistically based on a measured value of the extrusion force measured when coke actually produced in the coke oven is extruded from the carbonization chamber;
flattening equal to or more than one projection and/or recess so as to modify the inner wall surface of the carbonization chamber;
estimating a modified extrusion force after the at least one projection and/or recess has been flattened, the modified extrusion force being estimated by the coke extrusion force estimation method, wherein the oven wall profile of the coke extrusion force estimation method is a modified oven wall profile; and
specifying the projection and/or recess flattened as a repairing place when an increase/decrease amount between the extrusion force and the modified extrusion force exceeds a predetermined threshold, wherein
a repairing operation is performed on the repairing place.

5. The coke extrusion method according to claim 2, wherein the inner wall surface of the carbonization chamber is formed to have such a tapered shape that a third oven width at a guide vehicle side is larger than a fourth oven width at an extruder side of the coke oven.

6. The coke oven repairing method according to claim 4, wherein the extrusion force at each of a plurality of positions along the extrusion direction is estimated while the coke is displaced through each of the plurality of positions along the extrusion direction in the carbonization chamber.

7. The coke oven repairing method according to claim 4, wherein the inner wall surface of the carbonization chamber is formed to have such a tapered shape that a third oven width at a guide vehicle side is larger than a fourth oven width at an extruder side of the coke oven.

* * * * *